Aug. 24, 1948.   F. E. PAYNE   2,447,663
FLUID SEAL
Original Filed July 5, 1943

Inventor
Frank E. Payne
By Kent W. Wonnell
Atty.

Patented Aug. 24, 1948

2,447,663

UNITED STATES PATENT OFFICE 2,447,663

FLUID SEAL

Frank E. Payne, Glencoe, Ill., assignor to Crane Packing Company, Chicago, Ill., a corporation of Illinois Substituted for abandoned application Serial No. 493,546, July 5, 1943. This application June 16, 1945, Serial No. 599,804

3 Claims. (Cl. 286—11)

This invention relates in general to a fluid seal for relatively fixed and movable parts and is more particularly described as a balanced shaft seal for a pressure or vacuum pump.

An important object of the invention is to provide a fluid seal applied between a rotatable shaft, or the like, and its bearing, adapted to be wholly or partially balanced, or opposing the pressure applied to the seal to minimize sealing friction in maintaining a fluid-tight joint.

A further object of the invention is to provide a flexible, balancing seal, combined with inner spring means for maintaining sealing pressure on the parts at all times, particularly at low pressure, and when the shaft is not rotating.

A still further object of the invention is to provide a resilient and flexible sealing member having an interior pocket, which is distended by a spring, insuring a sealing pressure upon a frictional sealing disc which is also engaged by the resilient member.

A still further object of the invention is to provide a shaft sealing unit, comprising a flexible bellows seal having an expansion chamber with a shaft sealing lip, spring means in the chamber extensible in the same direction as the sealing member, and a frictional disc having a sealing ring opposite the flexible seal.

Figure 1:
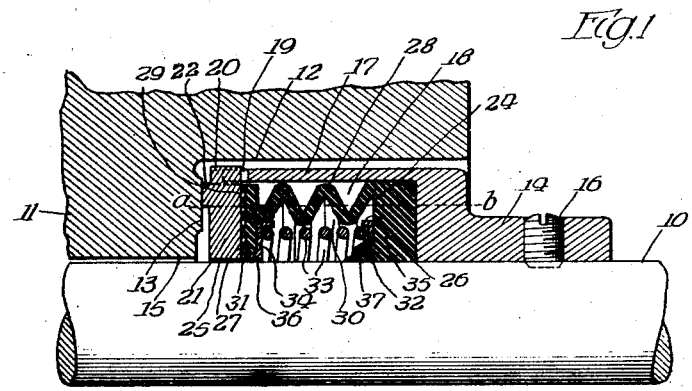
Figure 2:
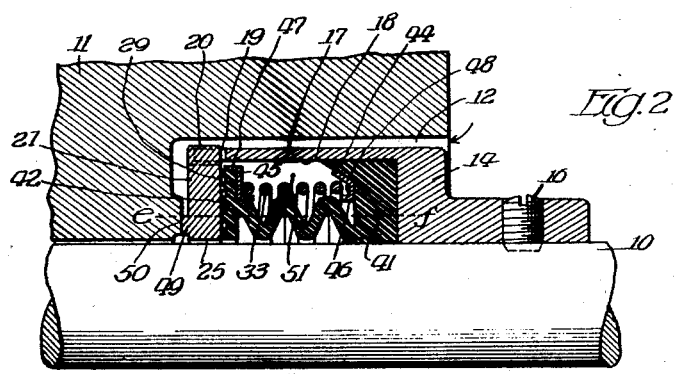
Figure 3:
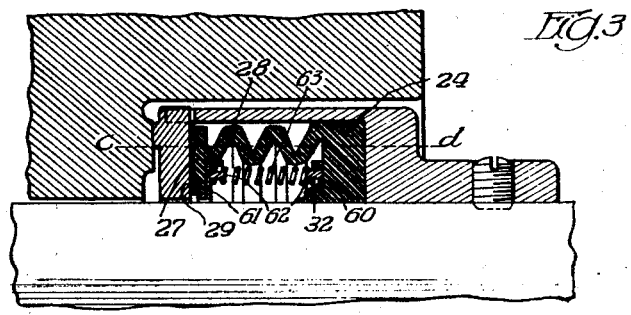

Other and further objects of the invention will appear in the specification and will be apparent from the accompanying drawing in which, Fig. 1 is a sectional view of an internal fluid pressure seal in accordance with this invention, applied between a shaft and a fixed portion of its bearing;

Fig. 2 is a partial sectional view of an external fluid pressure, or suction seal, between a shaft and a portion of its bearing; and Fig. 3 is a sectional detail of a modified spring distending means for a sealing member.

It is sometimes difficult to provide a satisfactory fluid-tight joint between relatively fixed and rotatable parts such as a shaft and its bearing for both high and low pressure, for vacuum pumps, and when the movable part is at rest. The present invention combines a flexible balancing pressure seal with an internal spring for resiliently extending it to maintain pressure at all times upon a frictional sealing disc which the sealing member also engages, and at the same time it insures that variation of pressure will cause no increase of pressure or friction between the fixed and rotatable parts.

Referring now more particularly to the drawings, a shaft 10 is rotatable in a fixed bearing 11, having a gland or packing recess 12 surrounding the shaft with a ground or honed frictional sealing contact surface 13 at the inner end. The shaft is shown as fitting loosely in the bearing or having small grooves 15 through which pressure may escape from one side of the bearing and along the shaft into the recess 12.

A relatively long driving cup 14 has a set screw 16 to secure it to the shaft and a flange 17 projecting inwardly in the bearing recess and forming a recess 18 in which a flexible and resilient sealing member 24 is seated. In the outer edge of the flange are notches 19 for receiving corresponding projections 20 of a frictional sealing disc 21 preferably formed with a projecting contact ring having frictional engagement with the corresponding honed contact surface 13 on the bearing in the recess 12.

The sealing member 24 comprises a flexible, resilient member of rubber, or like material, with integral ends 26 and 27 connected by an outer corrugated sleeve portion 28 having a number of extended bellows folds therein, the inner and outer grooves extending beyond a median line a—b between them to provide walls of expansive resilience. The bellows folds fit loosely in the cup recess 18 adapting the member to expand and contract freely therein.

Inside of the sealing member is an open space forming an annular chamber 30 which communicates with the leakage space surrounding the shaft through the inner peripheral leakage opening 31 of one end 27, the outer side of which engages the sealing disc 21. Pressure also leaks past the central opening 25 of the disc 21 which fits loosely on the shaft. The other end 26 of the sealing member fits tightly and is preferably preloaded on the shaft, and has a flexible, angular, graduated thin lip 32, extending inwardly from the end into the chamber 30 directly in contact with the shaft.

The outer side of the opposite end 27 is preferably formed with concentric grooves 29 so that the outer contact wall of the end will make a more fluid-tight engagement with the adjacent face of the friction disc 21 engaged thereby.

Located within the chamber 30 is an expansible spring 33 having extremities to engage with the inner sides of the ends 26 and 27, tending to assist the natural expansion of the sealing member, and to maintain sealing engagement thereof with the friction disc 21, particularly when the shaft is at rest and when pressure in the chamber is very low.

Instead of the ends of the spring 33 contacting directly with the inner sides of the sealing member, contact rings 34 and 35 are interposed. These rings may be flanged at their outer sides for retaining the springs, and they equally distribute the pressure upon the ends. Thus the springs need not be so accurately ground or finished at the ends as if directly in contact with the ends.

One contact ring 34 is provided with a flange 36 to engage and support the inner periphery of the sealing member end 25, and the other ring 35 has an inclined edge flange 37 to engage the inner inclined surface of the lip 32. The flange 36 prevents the end 25 from closing the leakage inlet 31. and the flange 37 bears on the lip and tends to hold the lip in place against centrifugal force when there is no pressure or little pressure in the chamber 30.

In practice, the inner diameter of the projecting contact ring of the friction disc is substantially the same as the effective outer diameter of the chamber 30 represented by the line a—b, so that when pressure is applied to the seal chamber along the shaft, through the leakage opening 31, the pressure within the sealing member and on the opposite side of the disc are substantially equalized.

In Fig. 2 the pressure is shown in the reverse direction, entering at the outer end of the bearing recess 12 and the leakage continuing along the shaft between it and the bearing. In this installation, the sealing member 40 is inverted or reversed, the ends 41 and 42 extending outwardly from the flexible bellows 43, one tight and the other loose on the shaft, and the lip 44 being at the outside and additionally sealing the recess 18. The spring 33 has end contact rings 45 with an outer flange 47 to support and confine the end 42, and 46 with an outer inclined flange 48 to engage and support the lip 44.

To complete this installation, which may be for vacuum or suction, as in a vacuum pump or a compressor, the friction sealing disc 21 has a ground or honed contact surface or ring 49, which engages a corresponding surface 50 on the bearing to make a fluid-tight joint. The outer diameter of the surface or ring 49 is substantially the same as the effective inner diameter of chamber 51 of the sealing member so that pressure on the opposite outer sides of the sealing disc 21 is substantially balanced and equalized, the spring 33 maintaining the seal at low pressure and when the parts are at rest.

When seals of this type are applied in relatively large diameters, the single coil spring must be of such high pressure that a spring construction as shown in Fig. 3 is preferably used. A pair of rings 60 and 61 with inner projections 62 at intervals are inserted in the chamber 30 of the resilient sealing member and a number of small coil springs 63 are inserted between corresponding projections. The rings distribute the pressure all around the ends of the sealing member.

In all forms, the chamber within the sealing member and the space at the opposite side of the friction disc within the contact ring thereof are of the same effective diameter as represented by the line a—b (and e—f) so that the pressure on opposite sides of the friction disc is substantially equalized. The expansion of the sealing member is assisted by the spring means within the expansion chamber and the leakage pressure upon the friction disc is always substantially equalized, requiring only the application of a comparatively light internal spring to maintain the proper sealing engagement particularly when the shaft is at rest and when there is a very light pressure.

Any slight longitudinal movement of the shaft is taken up in the loose connection of the driving flange with the disc and in the flexible connection of the seal itself. The sealing member and the sealing disc are rotated with the shaft by means of the cup member, and are installed therein as a unit depending upon the pressure or suction, and the position of the sealing surface on the disc is varied accordingly.

What is claimed is:

1. In a seal for a pair of relatively rotatable elements, said seal including a radially extending surface on one element, a washer having a radially extending surface in contact with the first-mentioned surface, and a rigid cup-shaped member secured to the other element and having a sliding driving connection with the washer; a flexible resilient sleeve within the cup-shaped member and having one end abutting the washer and the other end abutting the cup-shaped member, and spring means compressed between the said ends for maintaining the first-mentioned sleeve end against the washer, said second-mentioned end having a thin lip adjacent the membere subjected to pressure of the fluid to be sealed such that it forms a seal between the sleeve and member, and said sleeve having a section in the form of an extensible bellows to accommodate relative movement between the ends of the sleeve.

2. In a seal for a pair of relatively rotatable elements, said seal including a radially extending surface on one element, a washer having a radially extending surface in contact with the first-mentioned surface, a washer driving member comprising a cup having a hub, means for securing the hub to the other of the elements for rotation therewith, a substantially radially disposed surface within the cup and a slip-joint connection between the periphery of the cup and the washer; a sealing sleeve within the cup and including radially disposed end flanges adapted to contact the radial surface within the cup and the washer, a section connecting the flanges and having an angular cross-section to render it extensible, and a tapered lip surrounding the said other element and adapted to form a fluid-tight seal thereat upon the establishment of fluid pressure within the sealing sleeve; and spring means compressed between the said flanges for holding them in sealing engagement with the washer and cup and for urging the washer in sealing engagement with the first-mentioned element.

3. In a seal for preventing the passage of fluid under pressure between a pair of relatively rotatable elements, said seal including a radially extending surface on one element, a washer having a radially extending surface in contact with the first-mentioned surface, and a rigid cup-shaped member secured to and surrounding the other element and having a sliding driving connection with the washer; a flexible resilient sleeve within the cup-shaped member and having one end abutting the washer and the other end abutting the cup-shaped member, the inside of the sleeve being exposed to the fluid under pressure, flanges at the ends of the sleeve, one of said flanges being in contact with the cup-shaped member and having a thin lip in contact with the relatively rotatable member surrounded by the sleeve, the thin lip being exposed to the fluid under pressure, and spring means compressed between the said flanges for maintaining the sleeve ends in contact with the washer and cup, said sleeve having a section between the flanges in the shape of an extensible bellows to accommodate relative movement between the ends of the sleeve, the surface on the washer in contact with the first-mentioned surface having a minimum diameter which is substantially equal to the mean diameter of the bellows section so that the pressure of the fluid upon the washer is substantially balanced.

FRANK E. PAYNE.

REFERENCES CITED

The following references are of record in the file of this patent:

UNITED STATES PATENTS

| Number | Name | Date |
| --- | --- | --- |
| 2,299,638 | Marvin | Oct. 20, 1942 |
| 2,251,219 | Brummer | July 29, 1941 |
| 2,276,622 | Leake | Mar. 17, 1942 |
| 2,337,639 | Brummer | Dec. 28, 1943 |